(12) United States Patent
Quach et al.

(10) Patent No.: US 7,895,421 B2
(45) Date of Patent: Feb. 22, 2011

(54) MECHANISM FOR USING PERFORMANCE COUNTERS TO IDENTIFY REASONS AND DELAY TIMES FOR INSTRUCTIONS THAT ARE STALLED DURING RETIREMENT

(75) Inventors: Nhon Quach, San Jose, CA (US); Sean Lie, Santa Clara, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 687 days.

(21) Appl. No.: 11/776,986

(22) Filed: Jul. 12, 2007

(65) Prior Publication Data
US 2009/0019317 A1    Jan. 15, 2009

(51) Int. Cl.
G06F 9/44    (2006.01)
(52) U.S. Cl. ...................................... 712/227
(58) Field of Classification Search ................... 712/227
See application file for complete search history.

(56) References Cited

U.S. PATENT DOCUMENTS

| | | | |
|---|---|---|---|
| 4,191,942 A | 3/1980 | Long | |
| 4,284,906 A | 8/1981 | Manfredi | |
| 4,855,622 A | 8/1989 | Johnson | |
| 5,719,800 A | 2/1998 | Mittal et al. | |
| 5,825,218 A | 10/1998 | Colli et al. | |
| 5,938,760 A * | 8/1999 | Levine et al. | 712/220 |
| 6,043,692 A | 3/2000 | Linoff | |
| 6,189,072 B1 * | 2/2001 | Levine et al. | 711/118 |
| 6,233,531 B1 | 5/2001 | Klassen et al. | |
| 6,530,042 B1 * | 3/2003 | Davidson et al. | 714/47 |
| 6,556,952 B1 * | 4/2003 | Magro | 702/183 |
| 6,624,681 B1 | 9/2003 | Loyer et al. | |
| 6,772,322 B1 * | 8/2004 | Merchant et al. | 712/227 |
| 6,826,704 B1 | 11/2004 | Pickett | |
| 6,976,182 B1 | 12/2005 | Filippo | |
| 6,988,217 B1 | 1/2006 | Madrid et al. | |
| 7,395,527 B2 * | 7/2008 | DeWitt et al. | 717/127 |
| 7,571,076 B2 * | 8/2009 | Matsuzaki et al. | 702/182 |
| 2004/0030941 A1 | 2/2004 | Barr et al. | |
| 2004/0064755 A1 | 4/2004 | Therien | |
| 2005/0283624 A1 | 12/2005 | Kumar et al. | |

FOREIGN PATENT DOCUMENTS

WO    WO0229535    4/2002

* cited by examiner

*Primary Examiner*—Jacob Petranek
(74) *Attorney, Agent, or Firm*—Meyertons, Hood, Kivlin, Kowert & Goetzel, P.C.; Rory D. Rankin (57) ABSTRACT

A system and method of accounting for lost clock cycles in a microprocessor. A method includes detecting a first reason which prevents exit of an entry from an instruction retirement queue, and incrementing a first count corresponding to the first reason, wherein the first count is incremented while the first reason prevents exit of the entry from the queue. A first point in time is determined when said first reason no longer prevents exit of the entry from the queue. A second reason which prevents exit of the entry from the queue is detected, wherein the second reason came into existence prior to said first point in time. A second count corresponding to the second reason is incremented, wherein incrementing the second count begins at the first point in time.

18 Claims, 8 Drawing Sheets

MECHANISM FOR USING PERFORMANCE COUNTERS TO IDENTIFY REASONS AND DELAY TIMES FOR INSTRUCTIONS THAT ARE STALLED DURING RETIREMENT

BACKGROUND OF THE INVENTION

1. Field of the Invention

This invention relates to computer systems, and more particularly, to finding the sources of lost cycles in a microprocessor, which create performance loss.

2. Description of the Relevant Art

Computer systems may have their performance increased after the systems are already built if the design is able to report necessary computing statistics. The statistics may correspond to the execution of software applications. Then the software applications may be modified, in order to improve subsequent executions of applications, in accordance with the feedback provided by the computing statistics. One manner to obtain the necessary computing statistics is to have the one or more microprocessors in the system provide the necessary computing statistics as the microprocessor(s) execute software applications.

Microprocessors may contain one or more processor cores, or processors, with each processor capable of performing the execution of instructions of an application. Modern processors are pipelined, or the processors are comprised of one or more data processing stages connected in series wherein storage elements are placed in between the stages. The output of one stage is made the input of the next stage during each transition of a clock signal. Level-sensitive latches may be used as storage elements in a pipeline at a phase-boundary, or a portion of a clock cycle. Edge-sensitive flip-flops may be used as storage elements in a pipeline at a cycle boundary. The amount of execution of an instruction performed within a pipeline stage is referred to as the amount of execution performed by integrated circuits between flip-flops at a clock cycle boundary. Ideally, every clock cycle produces useful execution for each stage of the pipeline. When an event occurs, such as a branch misprediction, a dependence of an instruction operand on a result of a previous instruction, a cache miss, etc, that prevents useful execution in a stage of the pipeline, then it is said an instructions-per-clock-cycle (IPC) loss occurs. No useful work is performed by the microprocessor during this pipeline stage. In order to reduce IPC losses in a pipeline, modern processors may execute instructions of a software program in a different sequence than the in-order sequence they appear in the program. The retirement of the instructions would be in-order still so that the architecture state would be valid in the case of an interrupt. In addition to this out-of-order execution, modern microprocessors may utilize data forwarding, compiler loop unrolling and rescheduling, improved branch prediction methods, parallel execution by multiple functional units, etc, in order to reduce IPC losses in a pipeline. When an IPC loss occurs for one instruction while useful work is still performed by at least a parallel second instruction that overshadows or hides the IPC loss of the first instruction, no performance loss is suffered. An IPC loss that is not overshadowed and does reduce performance will be referred to as an IPC loss.

Upon completion of a preset number of clock cycles used for execution of a software program, such as one million cycles, reported statistics of a microprocessor for performance enhancement may include both the number of IPC loss cycles and the source of the IPC loss cycles. This information may aid compiler programmers and software application programmers to restructure the sequence of instructions in an application for improved performance of subsequent executions of the application.

Modern microprocessors contain performance counters to monitor and report performance-relevant events such as the number of cache misses, cache miss penalties, the number of branch mispredictions, etc. However, design techniques used to increase throughput and to reduce IPC losses in a microprocessor pipeline make it more difficult to accurately measure and report performance statistics such as the number of IPC loss cycles and the source of IPC losses. For example, if an instruction experiences a data cache miss, the number of cycles of the miss penalty may not all reduce throughput due to out-of-order and superscalar execution. Useful work may be performed while the cache miss is being serviced. Simply counting the number of cycles of cache misses in a performance counter during program execution does not accurately report the effect of cache misses on the computer system. Additionally, accurately reporting statistics requires the counters and logic to not affect the performance of the execution of a program.

In view of the above, efficient performance monitoring methods and mechanisms are desired.

SUMMARY OF THE INVENTION

Systems and methods for performance monitoring in computer systems are disclosed. In one embodiment, a computer system includes one or more microprocessors coupled to memory, peripheral devices, and a bus and/or network. Each microprocessor may contain one or more processing cores for the execution of a software program. Each core, in order to increase throughput and take advantage of instruction-level parallelism, may include a superscalar architecture that incorporates a multi-stage pipeline, multiple-instruction issue, dispatch and retirement; and out-of-order execution. In-order retirement is maintained in order to maintain correct machine state in the event of an interrupt.

In one embodiment, a processor includes an instruction pipeline, an instruction retirement queue, and a performance monitor coupled to the pipeline and the queue. The performance monitor is configured to detect a first reason which prevents exit of an entry from the queue and increment a first count corresponding to the first reason, wherein the first count is incremented while the first reason prevents exit of the entry from the queue. The performance monitor is further configured to determine a first point in time when said first reason no longer prevents exit of the entry from the queue and detect a second reason which prevents exit of the entry from the queue, wherein the second reason came into existence prior to said first point in time. The performance monitor further increments a second count corresponding to the second reason, wherein incrementing the second count begins at the first point in time.

Reasons for an entry being unable to exit the queue may include branch misprediction, dispatch stalls, cache misses, and dependency between two instructions. Each source or reason of a IPC loss includes a penalty, or a number of clock cycles that the processor may not retire an instruction(s). In one embodiment, the processor is configured to retire 4 instructions per clock cycle.

These and other embodiments will become apparent upon reference to the following description and figures.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
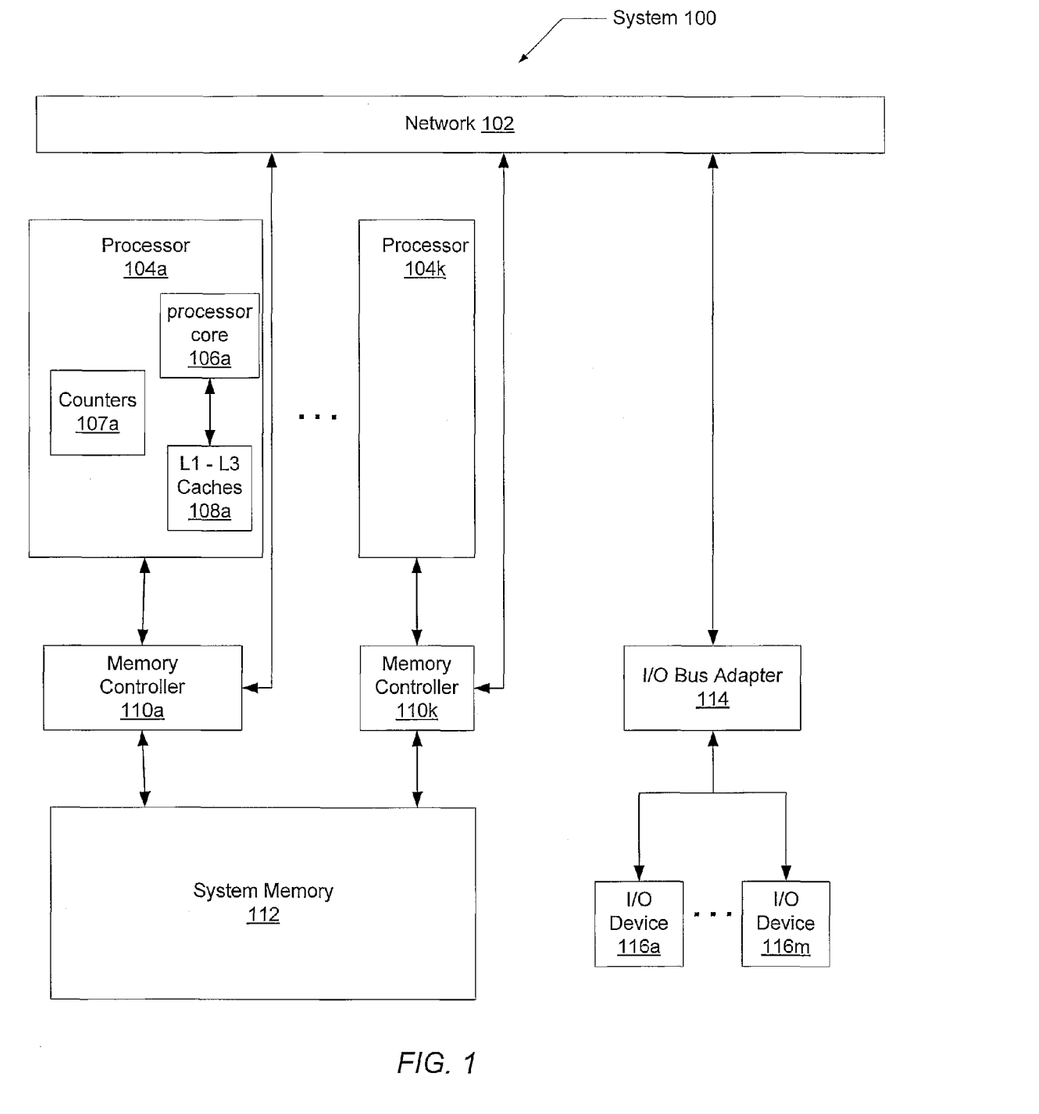
FIG. 1 is a block diagram illustrating one embodiment of a computer system.

Referring to FIG. 1, one embodiment of a computing system 100 is shown. A network 102 may include remote direct memory access (RDMA) hardware and/or software. Interfaces between network 102 and memory controller 110a-110k and I/O bus adapter 114 may comprise any suitable technology. I/O bus adapter 114 provides an interface for I/O devices 116a-116m to system memory 112 and processors 104a-104k. As used herein, elements referred to by a reference numeral followed by a letter may be collectively referred to by the numeral alone. For example, memory controllers 110a-110k may be collectively referred to as memory controllers 110. As shown, each memory controller 110 may be coupled to a processor 104. Each processor 104 may comprise a processor core 106, performance monitor related counters 107, and one or more levels of caches 108. In alternative embodiments, each processor 104 may comprise multiple processor cores. Each core may include a superscalar microarchitecture with a multi-stage pipeline. The memory controller 110 is coupled to system memory 112, which may include primary memory of DRAM for processors 104. Alternatively, each processor 104 may be directly coupled to its own DRAM. In this case each processor would also directly connect to network 102.

In alternative embodiments, more than one processor 104 may be coupled to memory controller 110. In such an embodiment, system memory 112 may be split into multiple segments with a segment of system memory 112 coupled to each of the multiple processors or to memory controller 110. The group of processors, a memory controller 110, and a segment of system memory 112 may comprise a processing node. Also, the group of processors with segments of system memory 112 coupled directly to each processor may comprise a processing node. A processing node may communicate with other processing nodes via network 102 in either a coherent or non-coherent fashion. In one embodiment, system 100 may have one or more OS(s) for each node and a VMM for the entire system. In other embodiments, system 100 may have one OS for the entire system. In yet another embodiment, each processing node may employ a separate and disjoint address space and host a separate VMM managing one or more guest operating systems.

An I/O bus adapter 114 is coupled to both network 102 and I/O devices 116a-116m. I/O devices 116 may include peripheral network devices such as printers, keyboards, monitors, cameras, card readers, hard disk drives and otherwise. Each I/O device 116 may have a device ID assigned to it, such as a PCI ID. The I/O Interface 114 may use the device ID to determine the address space assigned to the I/O device 116. For example, a mapping table indexed by the device ID may provide a page table pointer to the appropriate page table for mapping the peripheral address space to the system memory address space.

If, for example, processor cores 106 are designed to retire X number of instructions in-order per clock cycle (IPC), then each core 106 has a CPI of 1/X. For example, a microprocessor designed to retire 4 IPC has a CPI of 0.25. However, superscalar designs incorporate CPI loss cycles into a pipeline. During any particular clock cycle, a core 106 may retire less than 4 instructions due to performance losses. The CPI will increase from the ideal 0.25 and performance will decrease.

Computer systems may be compared to one another based on their performance on particular application(s). To measure the performance of computer system 100, an application may be run for a period of time, for example, one million clock cycles. Then the overall IPC may be measured and compared to other computer systems. Performance of a computer system 100 already built may be increased if software application and/or compiler designers are able to restructure the order of instructions of a software application. Designers may restructure the instructions based on statistics reported by the cores 106 that provide insight into the characteristics of the microarchitecture and how performance loss cycles are incorporated into the pipeline.

Figure 2A:
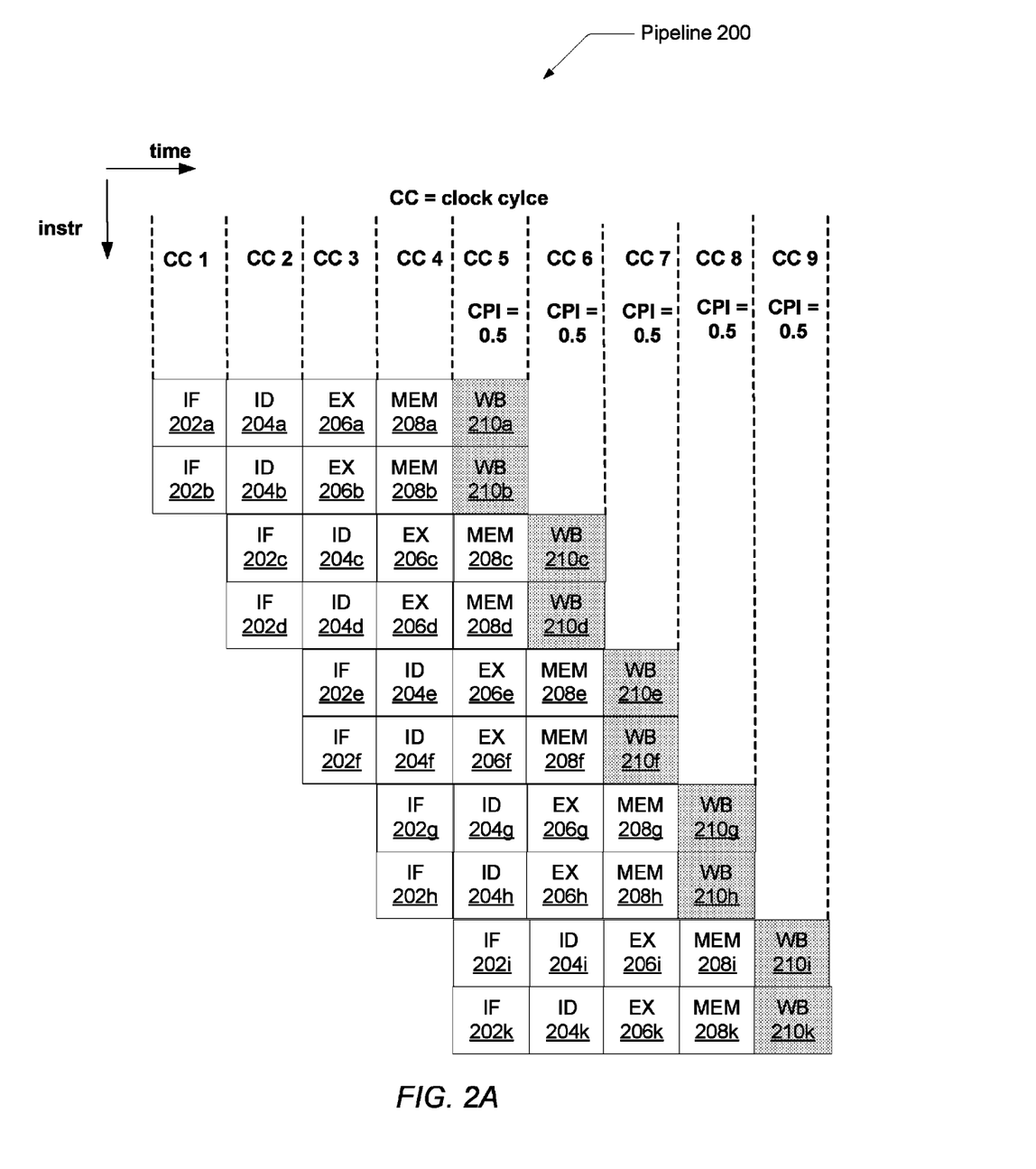
FIG. 2A is a block diagram illustrating one embodiment of the timing of a multi-stage microprocessor pipeline.

Turning to FIG. 2A, one embodiment of a classic five-stage pipeline 200 is shown. Here, in this simplified example, each stage requires one clock cycle. Pipelines of modern processors may have many more stages. Modern microprocessors are designed with multi-stage pipelines in order to allow parallel execution of two or more instructions in one clock cycle. Each stage may work on one or more instructions at a time. The microprocessor fetches one or more instructions from the instruction cache (i-cache) during the instruction fetch 202 stage. In this example, two instructions are fetched per clock cycle if there are no i-cache misses. During the instruction decode stage 204, the opcodes of the instructions are decoded, entries in a retirement queue may be allocated for the instructions, and the instructions are prepared for dispatch to a functional unit in the execution stage 206. The execution stage 206 may include multiple functional units and the purpose of the dispatcher in the instruction decode stage 204 is to keep the multiple functional units filled. Instructions may be dispatched for execution out-of-order to allow for higher throughput of the pipeline. Source operands may be retrieved from the microprocessor's general-purpose architectural registers, or register file. Alternatively, they may be retrieved from a retirement queue or a result bus based on forwarding logic.

Arithmetic operations occur in the execution stage 206. Branch prediction mechanisms may also occur in this stage. Memory accesses for load and store operations occur in stage 208. Finally, instructions retire in-order in the write-back stage 210 by having results of the instructions written to the appropriate entry of the 32-entry register file. The retirement queue may be a first-in, first out (FIFO) queue. The retirement queue ensures in-order retirement. Should an interrupt occur, an interrupt handler may later restore correct execution of the instructions, since in-order retirement maintains correct machine state. As can be seen from the example in FIG. 2A, two instructions may be retired per clock cycle (e.g., IPC=2), or the CPI is 0.5 each clock cycle once the pipeline is filled.

Figure 2B:
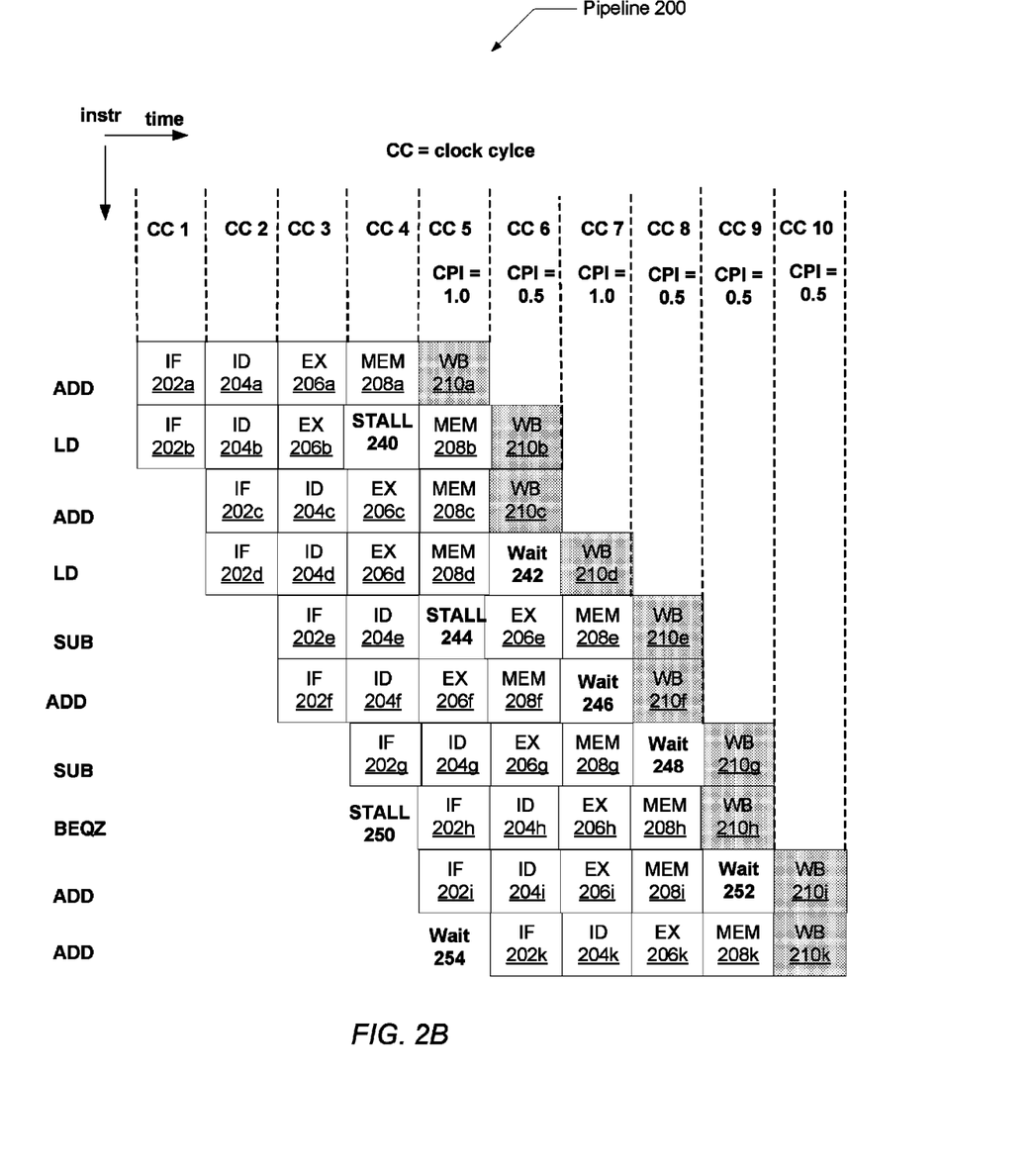
FIG. 2B is a block diagram illustrating one embodiment of the timing of a multi-stage microprocessor pipeline with stalls.

Referring to FIG. 2B, one embodiment of a classic five-stage pipeline 200 is shown with performance losses. IPC losses are clock cycles in a pipeline when the maximum potential amount work is not performed, and, thus, performance suffers. Here, the pipeline is not able to perform work on two instructions per stage every clock cycle. Therefore, once the pipeline is filled, the pipeline is not able to retire two instructions per clock cycle and performance has suffered. The CPI is no longer 0.5 as it was in the ideal case.

The sources of performance losses may include instruction translation lookaside buffer (i-TLB) misses, i-cache misses, d-TLB misses, d-cache misses, branch misprediction, dispatch problems, and dependency between two instructions. Dispatch problems may include the fetch of only one instruction, rather than two instructions, due to complex decoding, or the dispatcher is not able to dispatch two instructions to the execution stage due to insufficient number of functional units. In FIG. 2B, IPC loss 240 is due to a d-cache miss, IPC loss 244 is due to instruction dependency, and IPC loss 250 is due to an i-cache miss. Wait 242, 248 and 252 are due to the retirement queue only retiring two instructions per clock cycle. Wait 246 is due to the retirement queue performing in-order retirement. Note in this simple example, the CPI is not always 0.5 as in the ideal case, and 10 clock cycles are required to retire ten instructions versus 9 clock cycles in FIG. 2A without losses.

Figure 3:
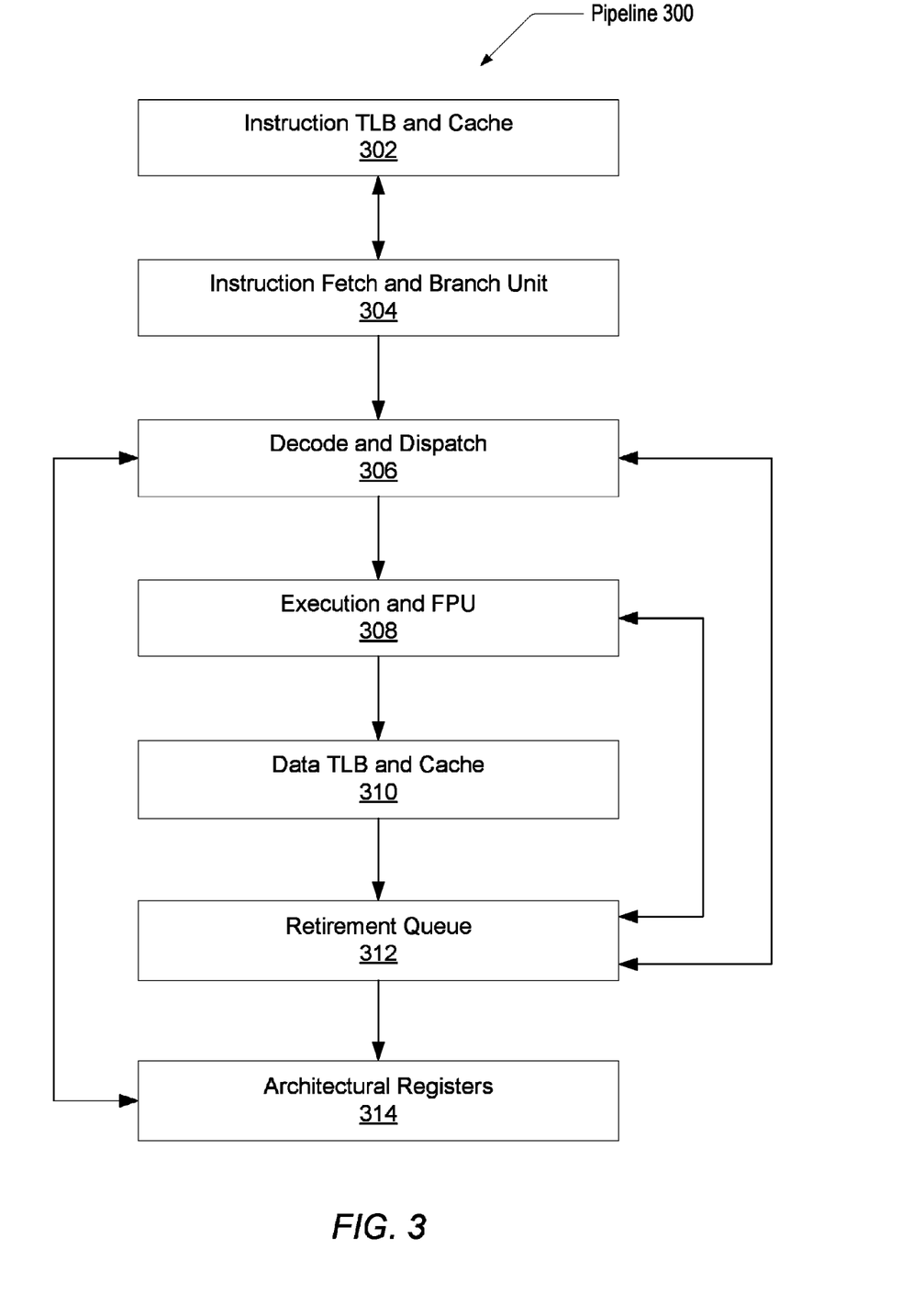
FIG. 3 is a block diagram illustrating one embodiment of the stages and hardware of a multi-stage pipeline.

FIG. 3 illustrates one embodiment of the hardware of a pipeline 300. In block 302, the i-TLB is loaded with instruction addresses and their respective translations. The i-cache is loaded with instructions of a program. There may be one or more levels of TLB and caches before access to main memory is necessary. One or more instructions may be fetched by use of a program counter assigned by the Instruction Fetch logic 304 and possibly a branch prediction mechanism. The instructions are loaded into registers. In the next clock cycle, the Decode block 306 decodes the opcodes of the one or more instructions and the Dispatch logic determines which instructions may be dispatched to functional units in the next clock cycle. The logic determines which instructions have available source operands and have a sufficient functional unit ready for use. The dispatcher may dispatch instructions out of program order in an attempt to keep the pipeline filled and reduce the occurrence of IPC losses or reduce the penalty of IPC losses. The Execution block 308 contains the functional units including a floating point unit (FPU) for arithmetic operations and possible zero detection or comparison logic used for conditional instructions such as branches.

In the next clock cycle, memory access instructions index the d-TLB and d-cache block 310. Like the i-TLB and i-cache, there may be one or more levels of TLB and caches before access to main memory is necessary. The retirement queue 312, possibly a FIFO queue, stores the results of the instructions as they complete. Results of the instructions may be data-forwarded to other instructions prior to being written in the retirement queue. The retirement queue ensures in-order retirement by writing results of the instructions into the architectural registers 314 in their original program order.

Figure 4:
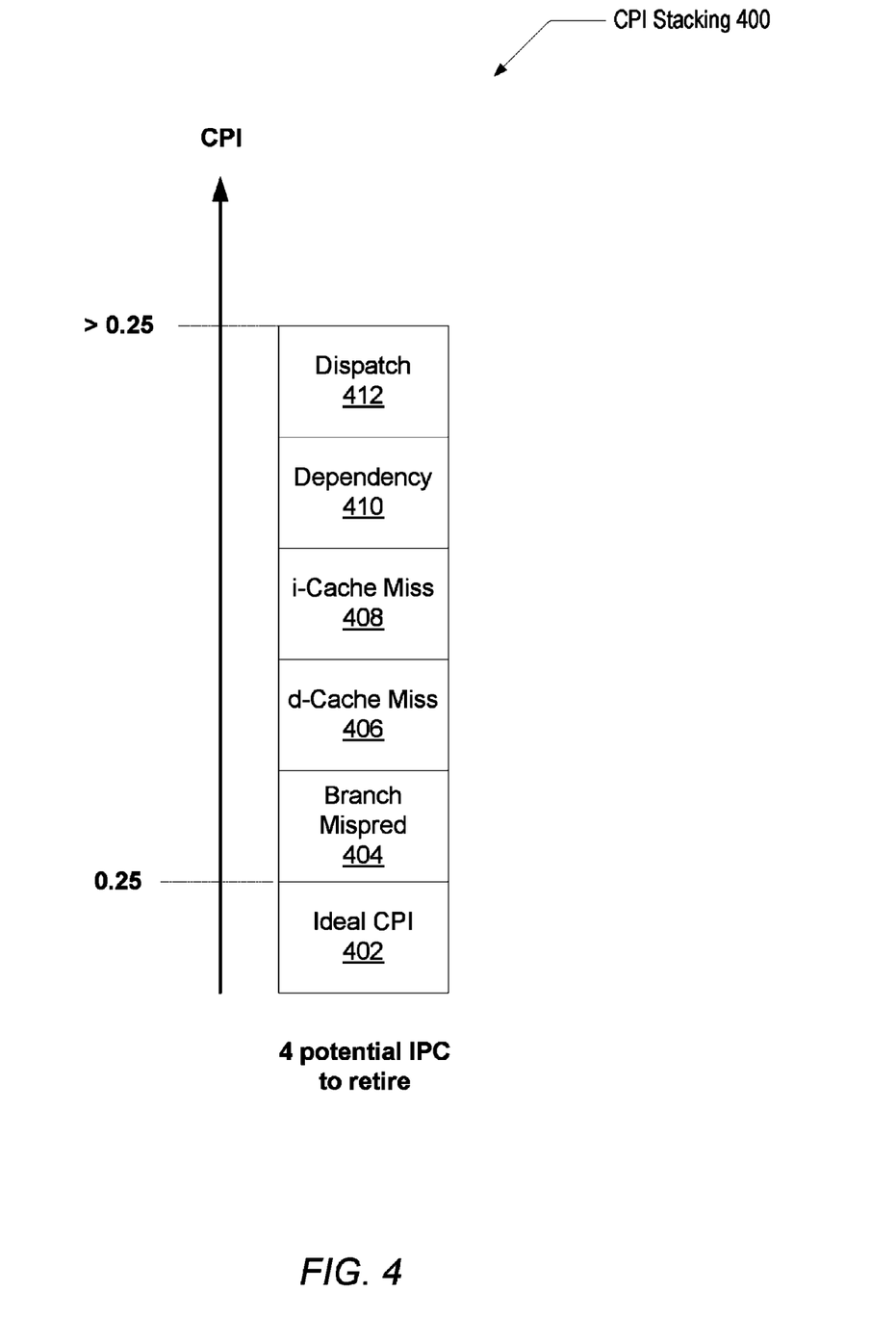
FIG. 4 is a block diagram illustrating one embodiment of IPC stacking.

Referring to FIG. 4, a generalized diagram of IPC stacking 400 is shown. Due to IPC losses in a pipeline, an ideal IPC 402 is not obtainable. In this example, a superscalar pipeline is designed to retire 4 instructions per clock cycle or have a CPI of 0.25. However, IPC loss cycles will cause this ideal IPC to increase. The percentage of increase due to each IPC loss may be different for each source. As mentioned before, sources of IPC losses and their respective percentage increase shown in the generalized block diagram may include, but are not limited to, branch misprediction 404, d-TLB and d-cache misses 404, i-TLB and i-cache misses, dependency between instructions 410, and non-ideal dispatch 412. Determining the source of IPC losses in a superscalar microarchitecture and the actual penalty which contributes to the CPI increases shown in FIG. 4 may help software designers. Having access to data as shown in FIG. 4 may lead to effective restructuring of the order of instructions in a program in an effort to reduce the CPI increases due to each source of IPC losses.

A software application may be run on a particular processor core in a computer system for a predetermined number of clock cycles, for example, one million cycles. A separate counter for each IPC loss source may maintain the IPC loss penalty clock cycles for the corresponding source. In one embodiment, 13 40-bit IPC loss counters may be used to monitor each of 13 sources of IPC loss in a microprocessor. For example, it may be determined that a microprocessor has the following 13 IPC loss sources: L1 i-TLB miss, L2 i-TLB miss, L1 i-cache miss, L2 i-cache miss, L3 i-cache miss, L1 d-TLB miss, L2 d-TLB miss, L1 d-cache miss, L2 d-cache miss, L3 d-cache miss, branch misprediction, dependency and dispatch. In order to reduce the addition of extra hardware in a microprocessor, pre-existing performance counters may be used as some or all of the necessary 40-bit IPC loss counters. At the completion of the one million cycles, the contents of the counters may be written to memory and then the values are read from memory. A diagram similar to FIG. 4 may be derived, except the new diagram would have 13 blocks in addition to the ideal IPC, rather than 5 blocks, and the source and penalty of IPC losses would be shown. The data would give a visual description of where software designers may wish to improve the ordering of instructions in an application.

Figure 5:
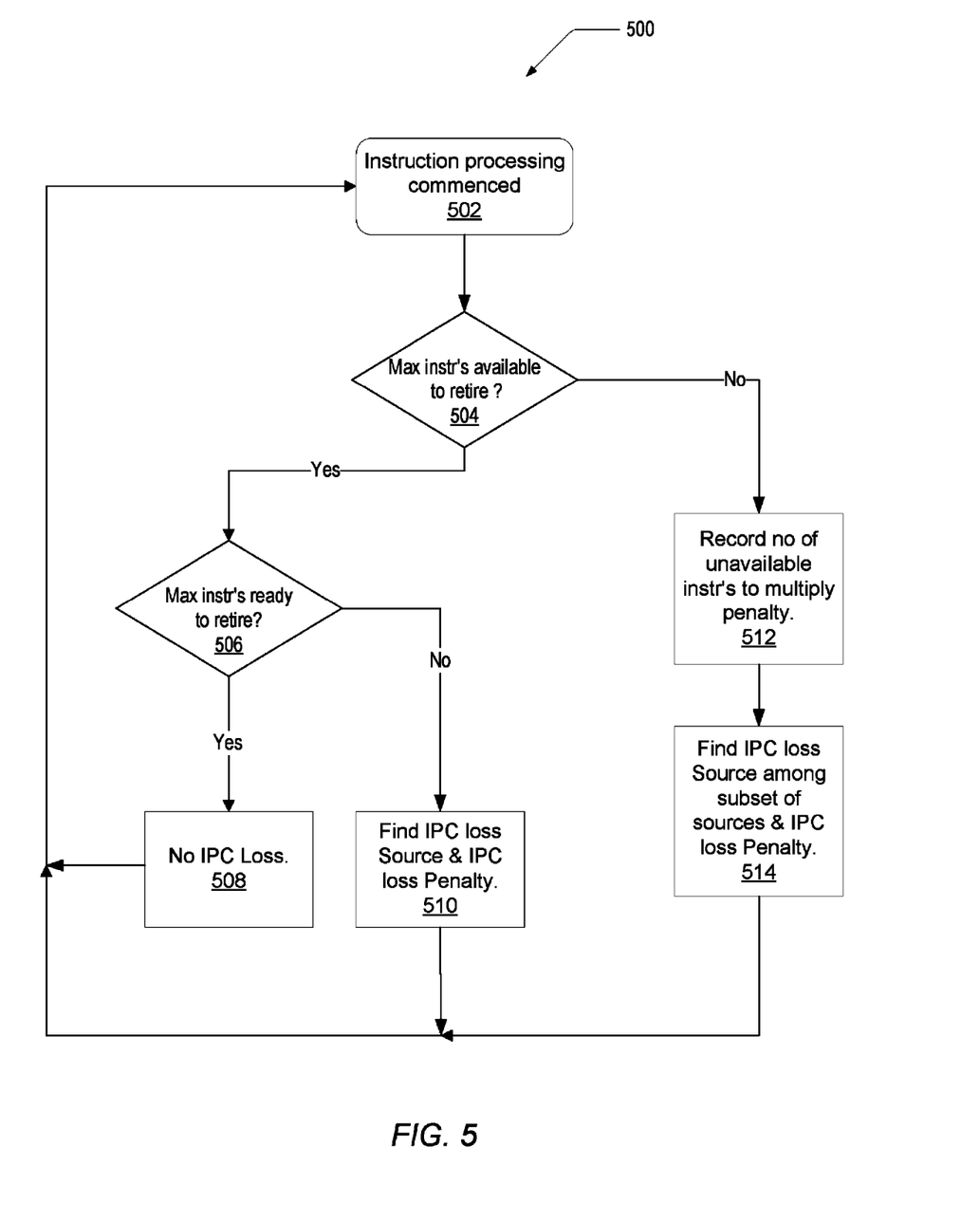
FIG. 5 is a generalized flow diagram of one embodiment of a method for accurate accounting of IPC loss.

FIG. 5 illustrates one embodiment of a general method 500 to determine the source and penalty of IPC losses in a superscalar pipeline. Once instruction processing has commenced (block 502), each branch misprediction causing a pipeline flush may initialize the branch misprediction timer to its initial non-zero value. The timer may decrement each clock cycle while it has a non-zero value. The method may check if the maximum number of instructions available to retire are available in decision block 504. Using the embodiment of FIG. 4, the pipeline was designed to retire 4 instructions per clock cycle. In one embodiment, logic in a retirement queue may verify there are 4 instructions available to retire. If so, the logic further verifies if the 4 available instructions are ready to retire (decision block 506). The retirement queue may be a FIFO and may use a head-of-queue pointer to ensure the instructions retire in-program-order. If all 4 instructions are ready to retire in the write-back stage of the pipeline, they may all retire and no IPC loss occurs (block 508). Method 500 returns to block 502. However, if not all 4 instructions are ready to retire, then extra logic and counters may be needed to find the source and penalty of the IPC loss (block 510). The CPI will increase and the logic in block 510 may determine how the CPI increased by finding the source and penalty of the IPC loss. Then a diagram similar to FIG. 4 may be derived in order to aid software and compiler designers.

If the maximum number of instructions available to retire, such as 4 instructions in one embodiment, are not available (decision block 504), the number of instructions not available (e.g., 1, 2, or 3 instructions) is recorded to accurately account for the penalty of the IPC loss (block 512). In this case, the pipeline was not filled in the front end of the pipeline, which may be due to an i-cache miss or a dispatch problem. Logic similar to step 510 is used to find the source and penalty of the IPC loss, but in this case, the source may be a subset of all sources. Method 500 may be used to collect statistics such as the source and penalty of IPC losses in a microprocessor core pipeline.

A known latency for each class of instruction may be associated with each instruction. The latency may correspond to the number of clock cycles required from the decode and dispatch stage to the write-back stage. As an example, integer and memory operations may require 8 clock cycles, floating point operations may require 14 clock cycles, and branch redirect latency may have a best case of 12 clock cycles. In order to fetch the instruction and load it into a decoder, 4 clock cycles, for example, may be needed. Therefore, an integer operation may require a 12-stage pipeline: 4 clock cycles for fetch and 8 clock cycles for decode to write-back. However, the 4 clock cycles corresponding to the instruction fetch is a constant for every instruction and it is unnecessary to include it in instruction latency accounting. Logic may be used in the decode stage to perform the association of a known latency to a particular instruction. When an instruction is entered into an entry in the retirement queue, the entry may contain an age counter for the corresponding instruction. The age counter is set to the appropriate value and it will decrement each subsequent clock cycle. In some embodiments, the age counter may decrement every two or more cycles which may reduce both power and the required hardware to implement the counter.

In addition to the 13 40-bit IPC loss counters and age counters, in one embodiment, a 5-bit tag may be used for instruction fetch misses or 1 bit for each of the 5 sources: L1 i-TLB miss, L2 i-TLB miss, L1 i-cache miss, L2 i-cache miss, L3 i-cache miss. When an instruction fetch miss occurs, logic determines which of the 5 possible sources caused the IPC loss in descending order as the order listed above (e.g., first possible miss is L1 i-TLB miss and last possible miss is L3 i-cache miss). The appropriate bit of the 5-bit tag is set and, in one embodiment, the tag is associated with the data word or memory location to be returned. For example, if the data word is 64 bits, then it grows to 69 bits to accommodate the 5-bit tag.

When the retirement window is not full, or the processor is not able to retire its maximum number of instructions per clock cycle, in one embodiment, a 16-bit saturating latency counter may begin incrementing. The head-of-queue pointer may index an empty entry in the retirement queue that should contain an instruction ready to retire, such as in this example. When the data word containing at least the instruction that was missed returns, the latency counter stops incrementing. The returned 5-bit tag is decoded to determine which IPC loss counter to increment by the value stored in the latency counter.

In the following instruction sequence examples in order to highlight some of the complexities of accurately detecting IPC loss sources and their corresponding accurate penalties, the following assumptions are made: 4 instructions may be retired in a single clock cycle, the pipeline has 12 stages, the fetch stage requires 4 clock cycles, the last two instructions shown are in the same 4-instruction retirement queue window for retirement, and instructions are integer operations that require a latency of 8 CC from decode stage to write-back stage, and CC represents clock cycle. As used herein, an instruction in a retirement queue entry indexed by the head-of-queue pointer may be referred to as the head-of-queue instruction. The following instruction sequence will be used to describe examples of cases where the branch misprediction penalty alters from its maximum penalty:

Instr G
.
Instr H
.
Instr A
Instr B
CC 20:   Instr G is head-of-queue, Instr G ready-to-retire, Instr G retires
         Instr A is fetched
         Instr B is attempted to be fetched, but misses
CC 21:   Instr A age counter set to 8 and decrements
         Instr B fetch miss is being serviced
CC 26:   Instr H is head-of-queue, Instr H ready-to-retire, Instr H retires
         Instr B is fetched
         5-bit tag is not used and the value is lost
CC 27:   Instr B age counter set to 8 and decrements
CC 28:   Instr A is head-of-queue, Instr A ready-to-retire, Instr A retires
         Instr B is head-of-queue, instr B not-ready-to-retire
         Instr B age counter is non-zero
CC 34:   Instr B is head-of-queue, Instr B ready-to-retire, Instr B retires
         Dispatch IPC loss counter is incremented by
         Latency counter value (6)

In this case, the penalty is charged to a latency in dispatch and not to an instruction fetch miss. However, if the instruction fetch miss requires more time to service, then the dispatch penalty is accompanied by the instruction fetch miss penalty. For example, such a pipeline sequence may appear as follows:

CC 20:   Instr G is head-of-queue, Instr G ready-to-retire, Instr G retires
         Instr A is fetched
         Instr B was attempted to be fetched, but missed
CC 21:   Instr A age counter set to 8 and decrements
CC 28:   Instr A is head-of-queue, Instr A ready-to-retire, Instr A retires
         None is head-of-queue
         Instr B age counter is zero (unknown instr at this time)
         Latency counter begins to increment
CC 36:   None is head-of-queue
         Instr B is fetched
CC 37:   Instr B is head-of-queue, Instr B not-ready-to-retire
         5-bit tag is used to decide which IPC loss counter needs updating
         Chosen IPC loss counter (1 of 5 instr fetch miss cases) is
         incremented by Latency counter value (10)
         Instr B age counter set to 8
CC 44:   Instr B is head-of-queue, Instr B ready-to-retire, Instr B retires Once the data word is returned, and in this case, the data word contains at least one instruction, the 5-bit tag may enter logic to decode which of the five instruction fetch miss cases needs to be charged with the IPC loss penalty. This occurs in CC 37 above. Afterwards, the IPC loss penalty cycles are charged to dispatch. The latency counter is reset after updating the appropriate IPC loss counter. Notice that other IPC losses may occur after Instr B, above, is fetched. For example, Instr B may experience a d-TLB or a d-cache miss. Should a d-cache miss occur, the latency counter would be used to update the appropriate IPC loss penalty at that time (e.g., one of the five instruction fetch miss cases, or dispatch) and then be reset and begun to increment again to account for the d-cache miss IPC loss penalty. The data fetch miss scenario may be handled in a similar manner as the instruction fetch miss scenario above. A 5-bit tag is set according to the type of miss, the tag accompanies the data word, and the tag is used upon return of the required data word to decode which IPC loss counter needs to be incremented by the value contained in the latency counter.

During a branch misprediction, in one embodiment, the entire pipeline is flushed including the retirement queue. In such a case, with no other IPC loss source occurring, the next fetched instruction, in this case the head-of-queue instruction at the time of the misprediction detection, may need as many clock cycles as stages in the pipeline to reach head-of-queue in the retirement queue. For example, in a 12-stage pipeline, the next instruction, such as an integer operation, will need 12 cycles to reach head-of-queue. Therefore, the IPC loss penalty for a branch misprediction would be 12 cycles. However, other conditions may arise to alter the actual number of IPC loss penalty cycles attributed to the branch misprediction. For this example, 12 may be the maximum penalty for a branch misprediction. Certain scenarios in program instruction sequence may reduce this penalty.

In the following instruction sequence examples to highlight some of the complexities of accurately detecting IPC loss sources and their corresponding accurate penalties, the following assumptions are made: 4 instructions may be retired in a single clock cycle, the pipeline has 12 stages, all instructions shown are in the same 4-instruction retirement queue window for retirement, after detection of a branch misprediction, all instructions in front of the branch in program order are allowed to retire and all instructions after the branch in program order are flushed; and instructions other than a branch are integer operations that require a latency of 8 CC from decode stage to write-back stage. The following instruction sequence will be used to describe examples of cases where the branch misprediction penalty alters from its maximum penalty:

Instr A

Instr Branch

Instr B

For these examples, the assumptions above of 4 instructions per clock cycle are able to retire in once clock cycle and a 12-stage pipeline will be used. However, any embodiment may be used. If Instr A experiences no IPC losses and Instr Branch experiences a misprediction, the IPC loss source is branch misprediction and the IPC loss penalty is 12 clock cycles. For this example, the prediction is taken, but is incorrect. Therefore, Instr B should be the correct next fetched instruction.

The pipeline sequence may appear as follows where CC stands for clock cycle:

| | |
|---|---|
| CC 32: | misprediction has been detected |
| | Instr A is head-of-queue, Instr A ready-to-retire, Instr A retires |
| | None is head-of-queue |
| | Branch Misprediction Timer is set to 12 and decrements each CC |
| | Branch Misprediction IPC Loss Counter increments each CC |
| CC 33: | None is head-of-queue |
| CC 36: | Instr B is fetched |
| CC 37: | Instr B is head-of-queue, Instr B not-ready-to-retire |
| CC 44: | Branch Misprediction Timer is 0 |
| | Branch Misprediction IPC Loss Counter is 12 and stops incrementing |
| | Branch Misprediction penalty is 12 CC |
| | Instr B is head-of-queue, Instr B ready-to-retire, Instr B retires |

However, if Instr A is independent of Instr Branch, Instr A has an IPC loss, such as a dispatch stall, and the stall requires 4 CC, for example, and Instr B has a IPC loss, such as a L1 i-TLB miss, and the miss requires 2 CC, then the pipeline sequence may appear as follows:

| | |
|---|---|
| CC 32: | misprediction has been detected |
| | Instr A is head-of-queue, Instr A not-ready-to-retire |
| | Branch Misprediction Timer is set to 12 and decrements each CC |
| CC 33: | Instr A is head-of-queue, Instr A not-ready-to-retire |
| | Instr B is attempted to be fetched, but misses |
| CC 34: | Instr A is head-of-queue, Instr A not-ready-to-retire |
| | Instr B fetch miss is being serviced |
| CC 35: | Instr A is head-of-queue, Instr A not-ready-to-retire |
| | Instr B fetch miss is being serviced |
| CC 36: | Instr A is head-of-queue, Instr A ready-to-retire, Instr A retires |
| | None is head-of-queue |
| | Branch Misprediction IPC Loss Counter increments each CC |
| | Instr B fetch miss is being serviced |
| CC 37: | None is head-of-queue |
| | Instr B fetch miss is being serviced |
| CC 38: | Instr B is fetched |
| CC 39: | Instr B is head-of-queue, Instr B not-ready-to-retire |
| CC 44: | Instr B is head-of-queue, Instr B not ready-to-retire |
| | Branch Misprediction Timer is 0 |
| | Branch Misprediction IPC Loss Counter is 8 |
| CC 46: | Instr B is head-of-queue, Instr B ready-to-retire, Instr B retires |

In the above sequence, the branch misprediction penalty is overshadowed 4 CC by the earlier L1 d-TLB miss penalty. The statistics reported for this sequence would be a dispatch stall with a penalty of 4 CC, a branch misprediction with a penalty of 8 CC, and a L1 i-TLB miss with a penalty of 2 CC.

Notice that by having larger and smaller penalties and the placement of the IPC losses in the pipeline, some IPC loss sources may be overshadowed by other IPC loss sources and not reported, or some IPC loss sources may have their IPC loss penalties reduced due to being overshadowed by another IPC loss source. For example, in the above sequence if a branch misprediction is determined in clock cycle 5, rather than clock cycle 12, then the maximum branch misprediction IPC loss penalty is 5 CC. This reduced maximum penalty may be achieved by the use of a trace cache, using an extra adder earlier in the pipeline and using data forwarding techniques associated with an out-of-order execution results bus. In the second sequence above, the statistics reported would be a dispatch stall with a penalty of 4 CC, a branch misprediction with a penalty of 1 CC, and a L1 i-TLB miss with a penalty of 2 CC.

Another IPC loss source is dependency between instructions. Logic may detect this IPC loss source by determining the head-of-queue instruction is not ready to retire, decoding the opcode to find the head-of-queue instruction is not a memory access operation, and determining the corresponding age counter is zero. A dispatch IPC loss source satisfies the same conditions, except the corresponding age counter has a non-zero value.

Figure 6:
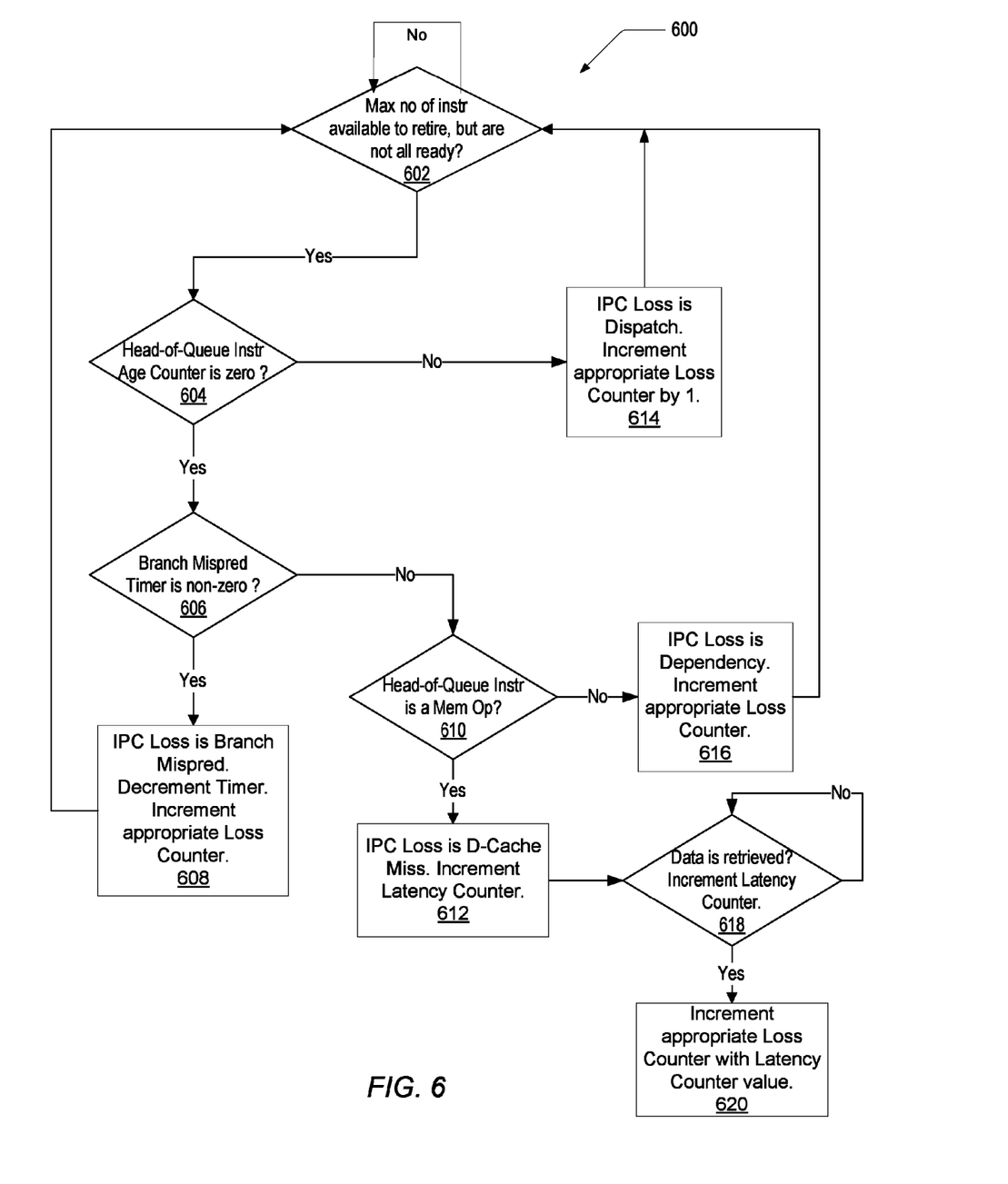
FIG. 6 is a flow diagram of one embodiment of a method for accurate accounting of IPC loss when the window of possible instructions to retire in the retirement queue is full.

FIG. 6 illustrates a method 600 for finding the source and penalty of a IPC loss when the retirement queue window is full in the write-back stage. Method 600 generally provides more detail for the processes corresponding to step 510 in FIG. 5. Using the example above of 4 instructions in this window, a determination is made as to whether the maximum number of instructions are available to retire, but are not all ready to retire (block 602). In one embodiment, logic used to find the source of a IPC loss and its corresponding penalty may begin with the head-of-queue instruction.

If the age counter of the head-of-queue instruction is non-zero (decision block 604), then the source of the IPC loss is Dispatch and its corresponding IPC loss counter is incremented by 1 to represent a clock cycle is not performing useful work (e.g., ultimately, not retiring 4 instructions per clock cycle) due to a dispatch problem earlier in the pipeline (block 614). As long as the head-of-queue instruction is not ready to retire, no instructions retire. Ultimately, if the condition persists, the entire pipeline may experience IPC loss. Also, note that the first clock cycle IPC loss by a head-of-queue instruction may not have a full 1 clock cycle penalty. For example, if 1, 2, or 3 instructions did retire prior to the head-of-queue instruction, then the corresponding penalty would be 0.25, 0.50, or 0.75 clock cycles. Subsequent IPC loss cycles have a penalty of a full clock cycle. However, for purposes of reporting statistics, the discrepancy incorporated by charging 1 during the first IPC loss cycle versus a fraction of 1 is negligent.

If the head-of-queue instruction has resided in the retirement queue longer than its normal latency, then the age counter for the head-of-queue instruction is zero (decision block 604). Sufficient clock cycles have occurred to complete the instruction and the instruction should be ready to retire. However, the head-of-queue instruction is not ready to retire. The branch misprediction timer is checked for a non-zero value (decision block 606). When the timer is non-zero, the IPC loss is due to a branch misprediction (block 608). The timer is decremented by 1, and simultaneously, the branch misprediction IPC counter is incremented by 1. The timer may be set to the number of stages in the pipeline and may begin to decrement in the clock cycle when the branch misprediction is determined. Following decision block 606, when the branch misprediction timer is zero, in one embodiment, the opcode may be decoded or previously decoded information is transmitted down the pipeline. This information is checked to find if the head-of-queue instruction is a memory operation (decision block 610).

If the head-of-queue instruction is not a memory operation, then the IPC loss is due to dependency between instructions and the IPC loss counter corresponding to dependency IPC loss source is incremented by 1 (block 616). If the head-of-queue instruction is a memory operation, then the IPC loss is due to a d-TLB or d-cache miss. The data 5-bit tag is set accordingly, and accompanies the data word during the service of the miss. The 16-bit saturating latency counter is incremented by 1 (block 612). The latency counter continues to increment by 1 during each clock cycle until data returns from the service of the miss (decision block 618). The returned 5-bit tag, which was previously set in block 612, is used to determine which IPC loss counter is incremented by the value contained in the latency counter.

Figure 7:
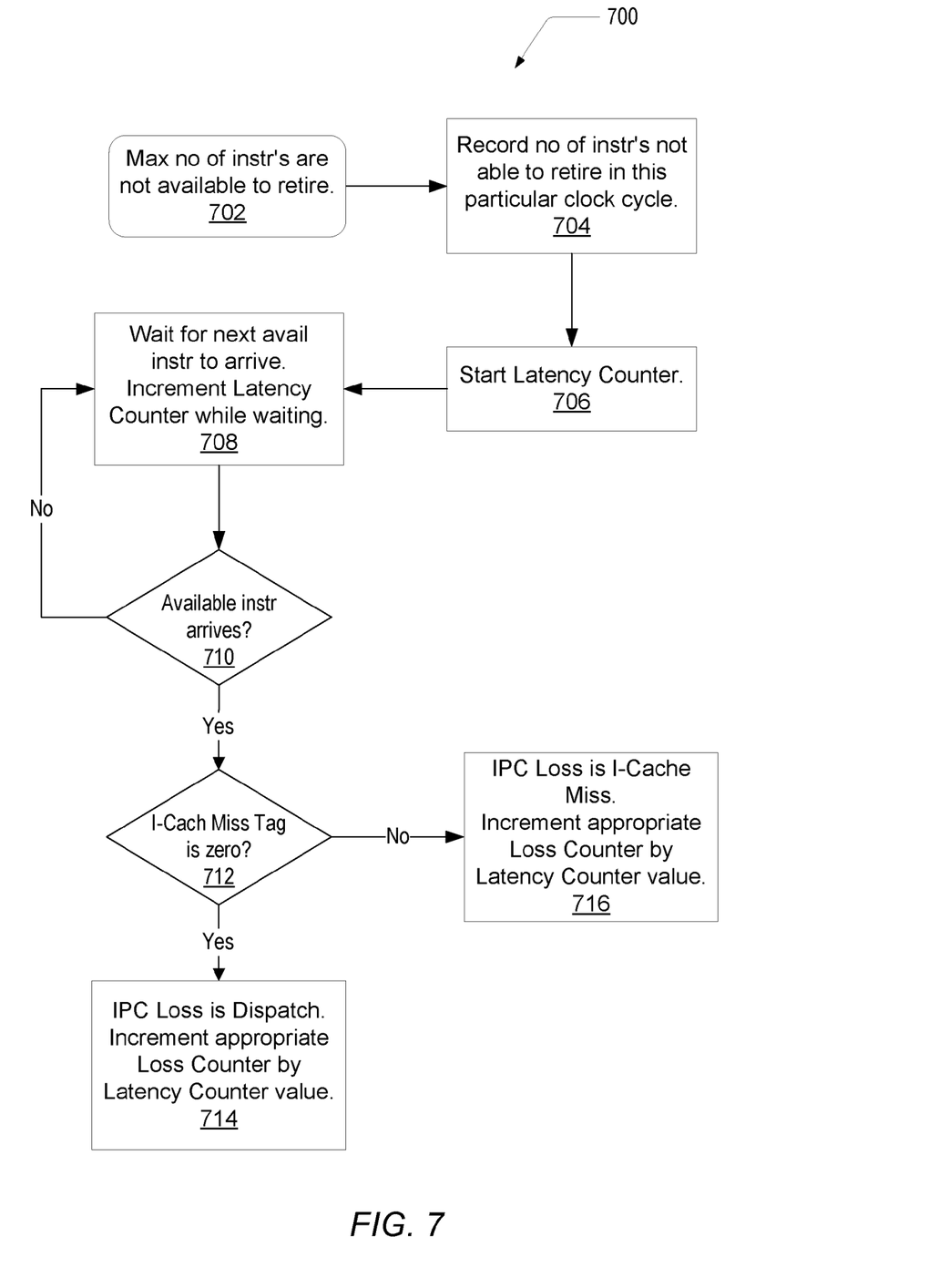
FIG. 7 is a flow diagram illustrating one embodiment of a method for accurate accounting of IPC loss when the window of possible instructions to retire in the retirement queue is not full.

Turning now to FIG. 7, a method 700 for finding the source and penalty of a IPC loss when the retirement queue window is not full in the write-back stage is shown. Using the example above of 4 instructions in this window, here, less than 4 instructions are available for retirement in the write-back stage (block 702). This step also corresponds to step 512 in FIG. 5. Method 600 provides more detail for the processes following step 512. In one embodiment, logic used to find the source of a IPC loss and its corresponding penalty begins with the head-of-queue instruction.

The number of instructions not able to retire in this particular clock cycle is recorded (block 704). In this example, this could be 1, 2, 3, or 4 instructions.

In one embodiment, the 16-bit saturating latency counter, which was previously reset, begins incrementing by 1 each clock cycle (block 706). The counter continues to increment until an instruction fills the head of the retirement queue and is ready to retire (block 708). If such an instruction arrives (decision block 710), the 5-bit tag associated with a i-TLB or i-cache miss is checked for a non-zero value (decision block 712). If the 5-bit tag is zero, then the IPC loss is due to a dispatch problem and the corresponding IPC loss counter is incremented by the value in the latency counter (block 714). Then the latency counter may be reset.

If the 5-bit tag is non-zero (decision block 712), then the IPC loss is due a i-TLB or i-cache miss. The returned 5-bit tag, which was previously set at the time of the instruction fetch and subsequent miss, is used to determine which IPC loss counter is incremented by the value contained in the latency counter (block 716). Then the latency counter may be reset.

In one embodiment, the algorithm which the FIROB uses to determine the source of IPC loss is given below. Note that in various embodiments, decrementing of age counters of the instruction in the FIROB may be performed every cycle. However, in alternative embodiments, decrementing may be performed on a multi-cycle basis which may result in power savings. All such alternatives are contemplated. In the following example, decrementing is performed every two cycles.

1) For every two cycles, decrement the age counters of the instruction in the FIROB.
2) For each branch misprediction causing a pipeline flush, start the branch misprediction timer.
3) If the branch misprediction timer is not zero, decrement it by 1.
4) For each instruction dispatched, convert its 5-bit I cache miss tag into a 2-bit tag and keep it in the FIROB.
5) Are there at least four instructions in the FIROB?
   a) Yes,
      i) Are all four instructions ready to retire?
         (1) Yes, no IPC is lost. Do nothing.
         (2) No. Is the age counter zero?
            (a) Yes. Is the pipeline flush timer non-zero due to a branch misprediction?
               (i) Yes, increment the branch misprediction IPC loss counter by 1
               (ii) No. Is the last instruction to be retired a memory access?
                  1. Yes, start the latency counter. Wait for the data to come back. Is the Data cache miss tag non-zero?
                     a. Yes. Increment the appropriate IPC loss counter by the amount indicated in the latency counter (L1TLB, L2TLB, Cache, etc.). Clear the latency counter.
                     b. No. Increment the dependency IPC loss counter by 1. - No,
                       is the I cache miss tag zero?
                  2. Yes, increment the dispatch IPC loss counter by 1
                  3. No, increment the dispatch + FE IPC loss counter by 1
   b) No. Initialize the lower two order bit to the number of instructions that cannot be -continued retired in that particular cycle. Start the 12-bit memory latency counter, and wait
for the next instruction to be dispatched into the FIROB. Is the cache miss tag
zero?
  i) Yes, increment the dispatch IPC loss counter by the amount indicated in the
    latency counter.
  ii) No. Increment the appropriate IPC loss counter by the amount indicated in the
    latency counter (TLB or cache)
6) Compute the I cache miss tag and D cache miss tag.
  a) In the FE, for every instruction that misses the L1 ITLB or L2TLB, set the
    appropriate ITLB miss tag bits. If the instruction misses the L1 I cache, L2 cache,
    or L3 cache, set the appropriate I cache miss tag bit(s).
  b) In the LS, for every memory' request, set the L1 DTLB miss bit, L2TLB miss, L1
    D cache miss, L2 cache miss, and L3 cache miss tag bits according to the status of
    the instruction.
  c) In L2, for every Ifetch returned to IF, indicate if the Ifetch has encountered an L2
    or L3 miss.
  d) In CI, for every Ifetch returned to the FE, indicate if the Ifetch has encountered an
    L2TLB miss.
  e) In the L3, for every (fetch that misses the L3, set the L3 miss it.
  f) The D cache miss tag is computed in the same manner.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    detecting a first reason which prevents exit of an entry from an instruction retirement queue;
    incrementing a first count corresponding to the first reason, wherein the first count is incremented while the first reason prevents exit of the entry from the instruction retirement queue;
    determining a first point in time when said first reason no longer prevents exit of the entry from the instruction retirement queue;
    detecting a second reason which prevents exit of the entry from the instruction retirement queue, wherein the second reason came into existence prior to said first point in time; and
    incrementing a second count corresponding to the second reason, wherein incrementing the second count begins at the first point in time.

2. The method as recited in claim 1, wherein the first count represents a contribution of the first reason for a delay of exit of the entry from the instruction retirement queue, and the second count represents a contribution of the second reason for the delay.

3. The method as recited in claim 2, further comprising assigning highest priority to an oldest entry in said instruction retirement queue.

4. The method as recited in claim 3, further comprising operating pipeline coupled to the instruction retirement queue in a superscalar microarchitecture comprising out-of-order and parallel execution of operations of a processor.

5. The method as recited in claim 4, further comprising operating said instruction retirement queue as a superscalar reorder buffer that retires said operations in-order.

6. The method as recited in claim 1, wherein said first reason and said second reason are selected from one of a branch misprediction, an i-TLB miss, and i-cache miss, a long dispatch, a dependency between instructions, a d-TLB miss, or d-cache miss.

7. A system comprising:
    an instruction pipeline;
    an instruction retirement queue; and
    a performance monitor coupled to the instruction pipeline and the instruction retirement queue, wherein the performance monitor is configured to:
        detect a first reason which prevents exit of an entry from the instruction retirement queue;
        increment a first count corresponding to the first reason, wherein the first count is incremented while the first reason prevents exit of the entry from the instruction retirement queue;
        determine a first point in time when said first reason no longer prevents exit of the entry from the instruction retirement queue;
        detect a second reason which prevents exit of the entry from the instruction retirement queue, wherein the second reason came into existence prior to said first point in time; and
        increment a second count corresponding to the second reason, wherein incrementing the second count begins at the first point in time.

8. The system as recited in claim 7, wherein the first count represents a contribution of the first reason for a delay of exit of the entry from the instruction retirement queue, and the second count represents a contribution of the second reason for the delay.

9. The system as recited in claim 8, wherein an entry in said instruction retirement queue is configured to store an entity being processed by the instruction pipeline and an associated status of the entity.

10. The system as recited in claim 9, wherein the instruction retirement queue is configured to assign highest priority to the oldest entry.

11. The system as recited in claim 7, wherein the instruction pipeline is configured to operate in a superscalar microarchitecture comprising out-of-order and parallel execution of instructions of a processor.

12. The system as recited in claim 11, wherein the instruction retirement queue is further configured to operate as a superscalar reorder buffer.

13. The system as recited in claim 7, wherein said first reason and said second reason are selected from one of a branch misprediction, an i-TLB miss, and i-cache miss, a long dispatch, a dependency between instructions, a d-TLB miss, or d-cache miss.

14. The system as recited in claim 13, wherein the performance monitor is configured to use existing hardware resources in the pipeline to determine IPC loss in the pipeline.

15. An performance monitor comprising:
- an interface configured to communicate with a pipeline including an instruction retirement queue;
- a first counter;
- a second counter; and
- a control unit, wherein the control unit is configured to:
  - detect a first reason which prevents exit of an entry from the instruction retirement queue;
  - increment a first count corresponding to the first reason, wherein the first count is incremented while the first reason prevents exit of the entry from the instruction retirement queue;
  - determine a first point in time when said first reason no longer prevents exit of the entry from the instruction retirement queue;
  - detect a second reason which prevents exit of the entry from the instruction retirement queue, wherein the second reason came into existence prior to said first point in time; and
  - increment a second count corresponding to the second reason, wherein incrementing the second count begins at the first point in time.

16. The performance monitor as recited in claim 15, wherein the control unit is further configured to detect a condition of an unsuccessful exit from said instruction retirement queue of only an entry which has a highest priority according to said instruction retirement queue.

17. The performance monitor as recited in claim 15, wherein the control unit is further configured to detect said first and second reason to be one of a branch misprediction, i-TLB miss, i-cache miss, a long dispatch, a dependency between instructions, or a d-TLB or d-cache miss.

18. The performance monitor as recited in claim 15, wherein the instruction retirement queue comprises a reorder buffer.

* * * * *